Aug. 23, 1960   E. R. ERICSSON ET AL   2,949,980
SPEED GOVERNOR
Filed March 18, 1958

INVENTORS
ERIC RAGNAR ERICSSON
CARL OSCAR SOHLBERG

By Hame and Kjdich
ATTORNEYS ed States Patent Office 2,949,980
Patented Aug. 23, 1960

2,949,980
SPEED GOVERNOR

Eric Ragnar Ericsson, Hagersten, and Carl Oscar Sohlberg, Stockholm No., Sweden, assignors to Telefonaktiebolaget L M Ericsson, Stockholm, Sweden, a corporation of Sweden Filed Mar. 18, 1958, Ser. No. 722,210

Claims priority, application Sweden Mar. 21, 1957

4 Claims. (Cl. 188—184)

The present invention refers to a speed governor for dials used in automatic telephony, in which a pinion on the governor shaft over a cog-wheel is so connected to the central shaft of the dial, that during the return motion of the dial, brake weights in the governor are moved outwardly into engagement with a brake drum. Thereby, the velocity of the dial is kept constant as it returns to its initial position after being actuated. Sometimes, however, a subscriber attempts to speed the return motion of the dial. In such a case the velocity can be so great that the switching devices actuated by the emitting impulses do not operate and therefore a wrong number is obtained. The object of the present invention is to provide an extra brake device for avoiding this inconvenience. According to the invention, a toothed gear is provided between the central shaft and the governor shaft which has diagonal teeth thus causing the governor shaft during rotation, to be displaced in an axial direction to actuate the second brake device.

Figure 1:
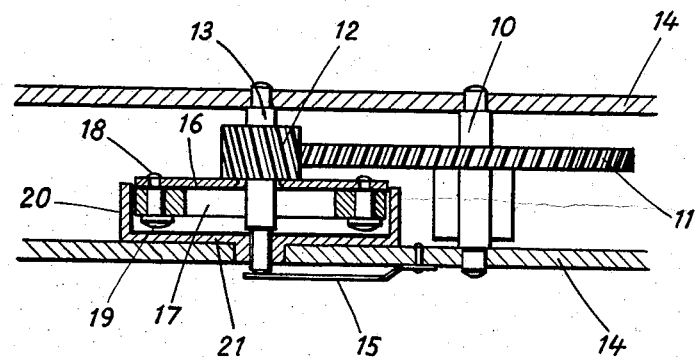
Figure 2:
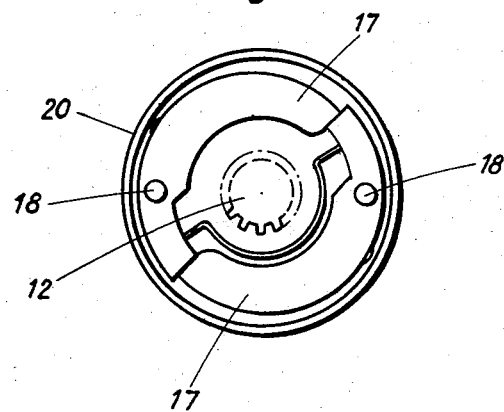

The invention will be described in greater detail in connection with the attached drawing. Fig. 1 shows a section of the governor and a part of the dial. Fig. 2 is a top view of the governor. On the drawing, only the necessary details are shown. For the rest the dial is supposed to be of normal construction.

In accordance with the present invention, a cog-wheel 11 is connected to a pinion 12 on the governor shaft 13. The cog-wheel shaft 10 and the governor shaft 13 are mounted in the body 14 of the dial. The governor shaft 13 is also axially displaceable in one direction. However, such shaft is kept in an initial rest position by a plate spring 15 riveted to the body 14, which plate spring presses the shaft in an opposite direction so that a shoulder on the shaft abuts against the body 14. In the governor body 16 attached to the shaft 13 two brake weights 17 are rotatably mounted in bearings by rivets 18. The lower heads of the rivets are shaped as brake studs. In the initial position shown on the drawing these brake studs are located some distance from the bottom plate 21 of the brake drum 20.

The cog-wheel 11 and the pinion 12 are, according to the invention provided with diagonal teeth so as to axially displace the governor shaft 13 after attaining a certain velocity and, the pressure of the spring 15 being overcome, the brake studs 19 are pressed against the bottom plate 21 of the brake drum to produce an extra brake effect upon the governor, aside from the brake effect which is obtained in a normal way. In conformity with this normal brake effect the brake effect, which is obtatined by an extra brake device (studs 19), increases with increases in the velocity of the governor shaft. Thus, if the dial is returned rapidly, two brakes limit the rotation velocity of the dial. The diagonal teeth also provide for dial rotation that is continuous and noiseless.

Of course, the axially operating brake device may be made in another way than the suggested device. By having special brake heads for the rivets carrying the revolving brake weights 17, an especially simple embodiment with two diametrical brake studs located the same distance from the governor shaft 13 may be obtained.

We claim:

1. In a speed governor for automatic telephone dials having a pinion mounted upon a governor shaft in meshing driven engagement with a cog wheel carried by the telephone dial, a brake drum, and radially outwardly acting brake elements carried upon said governor shaft for peripheral frictional engagement with said brake drum in response to a rotation of said governor shaft above a first predetermined speed, the improvement comprising: a stationary separate brake surface, additional brake means carried by said governor shaft for axial movement into braking action with said separate brake surface, spring means normally urging said additional brake means away from said separate brake surface, and said pinion and cog wheel having diagonally meshing teeth effecting axial movement of said additional brake means toward said separate brake surface against said spring means in response to a driving action of said cog wheel upon said pinion due to a governor shaft speed above a second predetermined speed in excess of said first predetermined speed.

2. In a speed governor as set forth in claim 1, wherein said additional brake means comprises a pair of brake studs mounted upon said governor shaft facing said separate brake surface.

3. In a speed governor as set forth in claim 2, wherein said brake elements comprise centrifugal brake weights, said brake weights facing radially outwardly from said governor shaft, and said brake studs comprise rivets securing said brake weights to said governor shaft.

4. In a speed governor as set forth in claim 3, wherein said spring means comprises a leaf spring acting axially upon said governor shaft to urge said additional brake means in a direction away from said separate brake surface.

References Cited in the file of this patent

UNITED STATES PATENTS

| 1,021,347 | Windhoff | Mar. 26, 1912 |
| 2,340,491 | Sagner | Feb. 1, 1944 |

FOREIGN PATENTS

| 918,063 | Germany | Sept. 16, 1954 |